E. HERSEY.

Machine for Cutting the Heads and Bottoms of Wooden-Boxes.

No. 6,367. Reissued April 6, 1875.

Witnesses.

Wm. P. Edwards

E. A. Hemmenway

Inventor.

Edmund Hersey

THE GRAPHIC CO. PHOTO-LITH. 39 & 41 PARK PLACE, N.Y.

UNITED STATES PATENT OFFICE.

EDMUND HERSEY, OF HINGHAM, MASSACHUSETTS.

IMPROVEMENT IN MACHINES FOR CUTTING THE HEADS AND BOTTOMS OF WOODEN BOXES.

Specification forming part of Letters Patent No. 62,846, dated March 12, 1867; reissue No. 6,367, dated April 6, 1875; application filed March 1, 1875.

*To all whom it may concern:*

Be it known that I, EDMUND HERSEY, of Hingham, in the county of Plymouth and State of Massachusetts, have invented a new and Improved Machine for Cutting Heads and Bottoms of Wooden Boxes, and for other articles; and I do hereby declare that the following is a full, clear, and exact description thereof, which will enable others skilled in the art to make and use the same, reference being had to the accompanying drawings, forming part of this specification.

This invention relates to a new and improved machine for cutting the bottoms and heads of wooden boxes and measures; and it consists of a cutter of peculiar construction, attached to a rising and falling frame, and used in connection with a block, over which the cutter works, and on which the stock or wood from which the bottom or head is cut is placed, all being constructed and arranged as hereinafter fully shown and described.

Figure 1:
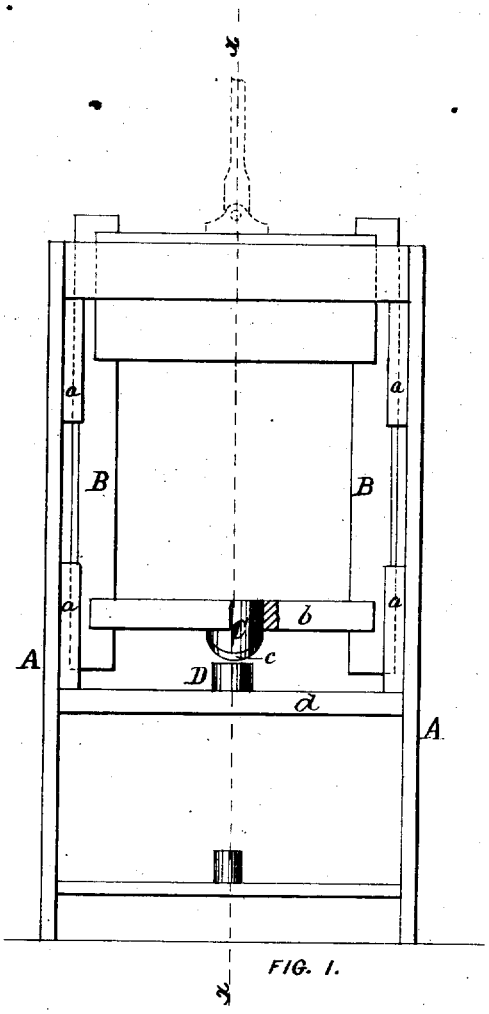
Figure 2:
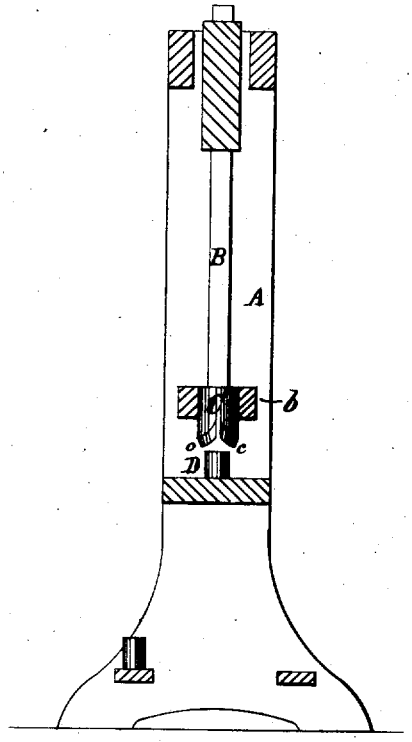
Figure 3:
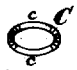
Figure 4:
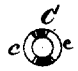

In the accompanying sheet of drawings, Figure 1 is a front view of my invention; Fig. 2, a side sectional view of the same, taken on the line *x x*, Fig. 1; Figs. 3 and 4, end views of the cutters pertaining to the same.

Similar letters of reference indicate like parts.

A represents an upright framing, in which a rising and falling frame, B, is fitted, and allowed to work freely up and down between suitable guides *a*. This frame B may be operated by a crank and pitman, or by other suitable means. In the lower cross-piece *b* of the frame B a cutter, C, is fitted, and it may be of circular or elliptical form in its transverse section; but, of whichever form, it should have its cutting-edges composed of two gouge-shaped parts, *c c*, which may be formed by cutting, filing, or otherwise notching the cutting end of the cutter at two opposite points; or the body of the cutter may be composed of two longitudinal parts, as shown in Fig. 2, said parts being secured together by the cross-piece *b* of the frame, in which cross-piece the body of the cutter is fitted, (see Fig. 2,) and the lower end of each part grooved in gouge form.

If the cutter is of circular form, the body of the same is a cylinder, as shown in Fig. 4; if of elliptical form, the body of the cutter will be an elliptic in its transverse section, as shown in Fig. 3.

The cutter, as the frame B is forced down, works over a block, D, attached to a horizontal cross-piece, *d*, in the framing A, said block corresponding in form to the interior of the cutter. The wood from which the heads or bottoms are cut is placed on the block D, and when the frame B is forced down the cutter passes through the wood and over the block, the latter causing the heads or bottoms to be driven out through the upper end of the cutter.

In consequence of having the cutting-edge of the cutter formed of two gouge-shaped parts, it is made to cut freely and smoothly, and with but a moderate application of power.

Having thus described my invention, I claim as new and desire to secure by Letters Patent—

The tubular cutter C, having its cutting-edge composed of two gouge-shaped parts, *c c*, and arranged to operate as herein set forth, whether said cutter is made in one or two pieces, substantially as shown and described.

Executed at Boston this 27th day of February, A. D. 1875.

EDMUND HERSEY.

Witnesses:
WM. P. EDWARDS,
E. A. HEMMENWAY.